United States Patent [19]
Yip et al.

[11] Patent Number: 5,896,452
[45] Date of Patent: Apr. 20, 1999

[54] MULTI-CHANNEL ECHO CANCELER AND METHOD USING CONVOLUTION OF TWO TRAINING SIGNALS

[75] Inventors: William Chunhung Yip, Scottsdale, Ariz.; Thomas Nall, Crystal Lake, Ill.; Thomas Gerard Callaghan, Phoenix, Ariz.

[73] Assignee: Motorola, Inc., Schaumburg, Ill.

[21] Appl. No.: 08/653,570

[22] Filed: May 24, 1996

[51] Int. Cl.$^6$ ............................................... H04M 1/00
[52] U.S. Cl. .................... 379/410; 379/416; 379/406; 379/398
[58] Field of Search .......................... 379/410, 398, 379/411, 416, 406

[56] References Cited

U.S. PATENT DOCUMENTS

| | | | |
|---|---|---|---|
| 4,760,596 | 7/1988 | Agrawal et al. | 379/410 |
| 4,887,257 | 12/1989 | Belloc et al. | 370/32.1 |
| 5,050,160 | 9/1991 | Fuda | 370/32.1 |
| 5,164,989 | 11/1992 | Brandman et al. | 379/410 |
| 5,467,394 | 11/1995 | Walker et al. | 379/392 |

OTHER PUBLICATIONS

IEEE Standard Dictionary of Electrical and Electronics Terms, 6th Edition, IEEE Std. 100–1996.

*Primary Examiner*—N. Le
*Assistant Examiner*—Shih-Wen Hsieh
*Attorney, Agent, or Firm*—Gregory J. Gorrie

[57] ABSTRACT

A two-wire line and a four-wire line telephone system interface with each other through a hybrid (12). After a connection between the two and four-wire line systems is made, an echo canceler (10) provides training signals to the hybrid on the transmit path an generates echo cancellation signals on the receive path. An adaptive filter (16) is employed to provide the proper echo cancellation signals, while a controller (22) provides filter coefficients based on an error signal. The training signals include the convolution of an impulse function with a sin(x)/x function. Once the filter coefficients are determined for the particular call, the transmit path of the four-wire line system is switched in and voice data between the two systems my commence.

15 Claims, 4 Drawing Sheets

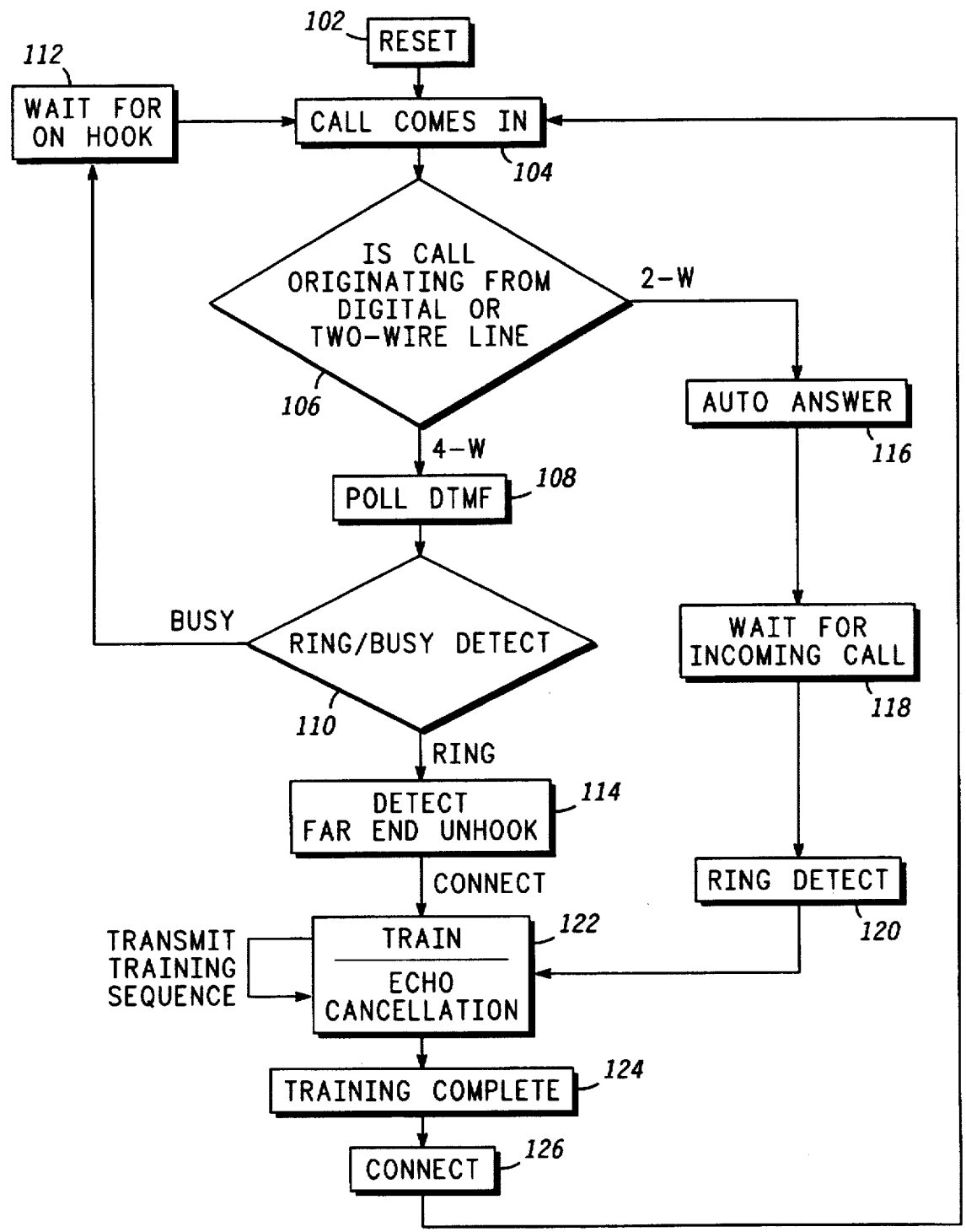
FIG. 2    100

MULTI-CHANNEL ECHO CANCELER AND METHOD USING CONVOLUTION OF TWO TRAINING SIGNALS

FIELD OF THE INVENTION

This invention relates in general to the field of echo cancellation, in particular to echo cancelers that reduce the effects of mismatch between mobile and land-line telephone systems.

BACKGROUND OF THE INVENTION

Echo cancelers are utilized in a variety of applications for canceling the effects of a reflected signal that results from the undesired coupling of a device's output signal (electrical or acoustic) back to its input signal path. Functionally, an echo canceler receives both the original reference signal and the reflected signal and attempts to approximate what the reflected signal will be from the original reference signal. The echo canceler subtracts this approximated reflected signal from the actual reflected signal to obtain an error signal. Ideally, this error signal is zero when the echo canceler has successfully approximated the reflected signal. Accordingly, no reflected signal will be returned back to the transmitting source as desired.

In typical telephone communication systems, some reflected signals result at the interface between two-wire lines systems such as the PSTN and four-wire line systems such as mobile or cellular communication systems. Some typical echo cancellation techniques provide predetermined fixed echo cancellation signals in the receive path of a four-wire line system. However, each connection to the PSTN is different resulting in a different impedance which results in different refection characteristics. As a result, fixed and predetermined echo cancellation techniques do not adequately suppress reflected signals.

Some other typical echo cancellation techniques continually change the echo cancellation signal during a telephone call in an attempt to compensate for the characteristics of that specific connection to the PSTN. However, because the reflected (echo) signal includes the voice signals, it is impossible to accurately estimate the reflection characteristics of the interface.

Accordingly, what is needed are an improved apparatus and method for suppressing signals that are reflected at the interface between two-wire line and four-wire line systems. What is also needed are an apparatus and method for canceling reflected signals that takes into account the characteristics of the connection to the PSTN. What is also needed are an apparatus and method that cancels reflected signals without interference from the voice communication.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 2 is a flow chart illustrating some of the steps performed by an echo canceler in accordance with a preferred embodiment of the present invention;

The exemplification set out herein illustrates a preferred embodiment of the invention in one form thereof, and such exemplification is not intended to be construed as limiting in any manner.

DETAILED DESCRIPTION OF THE DRAWINGS

In the preferred embodiments, the present invention provides, among other things, an echo canceler and method that uses specialized training signals to determine the reflective characteristics of an interface once a connection has been established. The present invention also provides an apparatus and method that suppresses the side tone or echo in channels caused by reflections at the interface between two-wire and four-wire communication systems. Echoes caused by long delays, (for example, delays greater than 64 milliseconds) are suppressed at a lower cost compared to current methods. In one preferred embodiment of the present invention, the apparatus and method employ training signals prior to voice communication to estimate the reflected signals. An inverse of the reflected training signal is generated using an adaptive filter and combined with the reflected training signal to cancel the reflected training signal. Least-means-square (LMS) calculations are performed on the error signal to determine filter coefficients for the adaptive filter.

Once the filter coefficients are determined, the signal path is switched to the normal path and voice communication may begin. During the subsequent voice communication, the filter coefficients remain the same. In one of the preferred embodiments of the present invention, the training signals are a convolution of an impulse function with sin(x)/x function.

Figure 1:
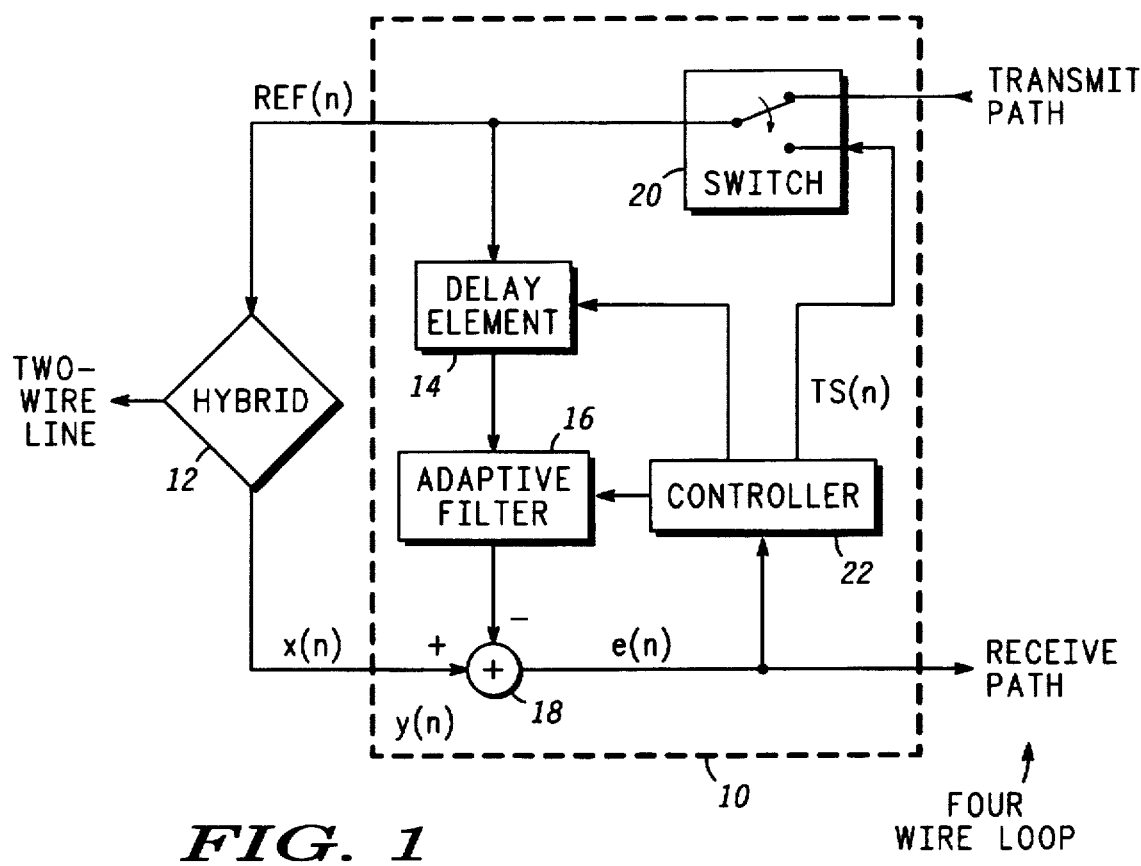
FIG. 1 is a simplified block diagram illustrating an echo canceler in accordance with a preferred embodiment of the present invention.

FIG. 1 is a simplified block diagram illustrating an echo canceler 10 in accordance with a preferred embodiment of the present invention. FIG. 1 also illustrates an interface with a telephony system whereby a four-wire loop is converted to a two-wire line through hybrid 12. Hybrid 12 provides the interface between the two types of communication systems and is not part of echo canceler 10. Typical two-wire systems include the public switched telephone network (PSTN) while typical four-wire systems include mobile and cellular telephone systems. In general, two-wire systems refer to communication systems that use one communication channel for both transmitting and receiving, while four-wire systems use separate channels for the transmit and receive paths. The use of the term "wire" does not necessarily imply actual hard wires, but includes any communication path including RF communication channels. In one embodiment, FIG. 1 may represent the functional elements in the switching center between a mobile telephone system and the PSTN.

For purposes of illustration only, assume that a reference signal ref(n) is transmitted from a transmitting source onto a four-wire loop and is received by hybrid 12. Hybrid 12 attempts to apply the signal onto the two-wire line and prohibit the transmitted signal from returning (as an echo) on the receive path of the four-wire loop. However, in order for hybrid 12 to eliminate the effects of echo, the hybrid must matched to the precise impedance of the two-wire line. However, the impedance of a two-wire line varies in different systems thereby causing a portion of the reference signal to be reflected by the hybrid back to the transmitting source. The reflected signal is illustrated as x(n). As a result, hybrids generally do not provide greater than 6 dB of attenuation in the reflected signal. Additionally, long range delays, such as those occurring as a result of transmission delays, or other system effects, may present problems for the attenuation in the reflected signal. Accordingly, echo canceler 10 is used to further attenuate or suppress the affects of reflected signal x(n).

In accordance with the preferred embodiments of the present invention, echo canceler 10 operates in two modes. The first mode is herein referred to as the training mode which operates before voice communication but after a connection has been established to the two-wire system. The second mode is herein referred to as the communication mode which operates after the training mode. The communication mode operates during voice communications between the two-wire and four-wire system.

During the training mode, echo canceler 10 transmits a training signal ts(n) to hybrid 12 along the transmit path. While sending the training signal to the two-wire line system, hybrid 12 produces a reflected signal x(n) along the receive path as a result of receiving the training signal. Because a connection with a two-wire line system has been established, the reflected signal represents the echo characteristics of the connection. Echo canceler 10 generates an approximated reflected signal y(n) and subtracts this approximated reflected signal from the reflected signal to obtain an error signal e(n). This error signal is small or zero when the echo canceler has successfully approximated the reflected signal by generating the inverse of the reflected signal. Accordingly, little or no reflected signal is returned back to the transmitting source as desired.

Echo canceler 10 includes controller 22 for generating and applying the training signals during the training mode and for providing filter coefficients for adaptive filter 16. Echo canceler 10 also includes switching element 20 for switching the transmit path between the training mode and the communication mode. During the training mode, switching element 20 functionally couples controller 22 to the transmit path allowing a training signal to be received by hybrid 12. Echo canceler 10 also includes delay element 14 coupled to the transmit path, summer 18 in the receive path and adaptive filter 16 coupled between delay element 14 and summer 18.

During the training mode, delay element 14 samples the training signal for a period of time and provides a delayed version of the training signal to adaptive filter 16. Delay element 14 is preferably a first-in-first-out (FIFO) memory for storing samples of the training signal and providing delayed samples of the training signals. Controller 22 may provide a control signal to delay element causing delay element 14 to change the amount of delay it provides. Adaptive filter 16 performs a transfer function on the sampled and delayed training signals provided by delay element 14 to produce a filtered training signal which is desirably the approximated reflected signal y(n) discussed above. Summer 18 subtracts the approximated reflected signal y(n) with the reflected signals from the hybrid to produce an output signal on the receive path.

During the training mode, the output signal of summer 18 is an error signal e(n) which is desirably small or zero when the approximated reflected signal y(n) approximates the reflected training signal x(n) from the hybrid. During the training mode, controller 22 samples the error signal e(n) and provides filter coefficients to adaptive filter 16 to desirably minimize the error signal e(n). At completion of the training mode, desirably no reflected training signals are returned back to the transmitting source. The final set of filter coefficients and the delay determined by controller 22 during the training mode are used during the communication mode.

At completion of the training mode, switching element 20 switches out controller 22 and connects the transmit path of the four-wire line system to hybrid 12 allowing for voice communication between the four-wire and two-wire systems. After the switching, voice communication may commence. During the communication mode, the delay provided by delay element 14 desirably remains fixed and the filter coefficients provided to adaptive filter remain constant. Accordingly, delay element 14 samples the voice data on the transmit path, delays it by a predetermined amount and adaptive filter implements a transfer function on the delayed voice data. This filtered, delayed voice data, which approximates the echo signals reflected by hybrid 12, is subtracted from the receive path signal by summer 18. Accordingly, any echoes or reflected voice signals from hybrid 12 are canceled, suppressed or attenuated.

In the preferred embodiments of the present invention, adaptive filter 16 is a typical L-tap filter. The filter coefficients are provided by controller 22 and are preferably based on Least-means-square (LMS) calculations performed on the error signal e(n). Other adaptive filters and other ways of calculating filter coefficients known in the art are also suitable for the present invention.

In one of the preferred embodiments of the present invention, the training signals provided by controller 22 are a convolution of an impulse function with sin(x)/x function. This allows the filter to concentrate on the major portion of the spectral energy of speech.

Echo canceler 10 is preferably implemented in a hand-held mobile subscriber unit, such as a mobile cellular telephone or a satellite cellular telephone. In one embodiment, echo canceler 10 reduces the long delay echo due to voice coding and transmission to satellites. In other embodiments, echo canceler 10 is implemented in a mobile switching center that interfaces between the PSTN and cellular type telephone systems.

An echo canceler typically includes additional components (not shown) including a "near-end" signal detector and a non-linear processor such as an echo suppresser or a center clipper. However, the elements shown in FIG. 1 are the primary components within the echo canceler that are the subject of the present invention. Accordingly, it is only these component of an echo canceler that are illustrated.

FIG. 2 is a flow chart illustrating some of the steps performed by an echo canceler in accordance with a preferred embodiment of the present invention. In the preferred embodiments of the present invention, some of the steps shown in FIG. 2 are performed by echo canceler 10 (FIG. 1) while other steps are performed by other elements of the communication system including the subscriber unit.

In task 102, Before a call comes in, or after a prior communication, the echo canceler is preferably reset. The previous filter coefficients and previous delay amount, for example, may be reset or set to initial values. Task 104 waits for an incoming or outgoing call to be received or initiated. Task 106 determines if the call has either originated from a two-wire line system such as the PSTN, or a four-wire line system such as a mobile telephone. When the echo canceler is part of a mobile telephone, the call may be originated by that mobile telephone.

When task 106 determines that the call originated from a four-wire line system, or from the mobile telephone of which the echo canceler is a part, tasks 108–114 are performed. When task 106 determines that the call originated from a two-wire line system, tasks 116–120 are performed.

In the case of a four-wire line originated call, task 108 polls the PSTN using standard techniques and task 110 detects either a ring or a busy signal from the PSTN. When a busy signal is detected, task 112 may wait for unhook, or terminate the call. When task 110 detects a ring at the PSTN end, task 114 waits to detect the far end unhook. At this point, a connection through the PSTN to the called party is established. Accordingly, the impedance of the two-wire line is seen by hybrid 12.

In the case of a two-wire line originated call, for example, when a call comes from the PSTN to a mobile telephone, tasks 116 and 118 perform the auto answering tasks associated with receiving a call on a typical mobile telephone and establish a connection to the PSTN. When task 120 detects the ring signal from the PSTN, the connection to the two-wire line system has been established. Accordingly, the impedance of the two-wire line is seen by hybrid 12.

Prior the commencement of task 122, voice communication may begin because the connection between the two-wire line system and hybrid has been established. However, task 122 delays voice communication and preferably mutes the voice paths. Task 122 performs the tasks of training and echo cancellation described in more detail below. During task 122, the adaptive filter coefficients and the delay amount are determined. Task 124 determines when training is complete. Training is complete preferably when the error signal is below a predetermined threshold. Once the training is complete, the voice path is switched in and voice data may be communicated.

Figure 3:
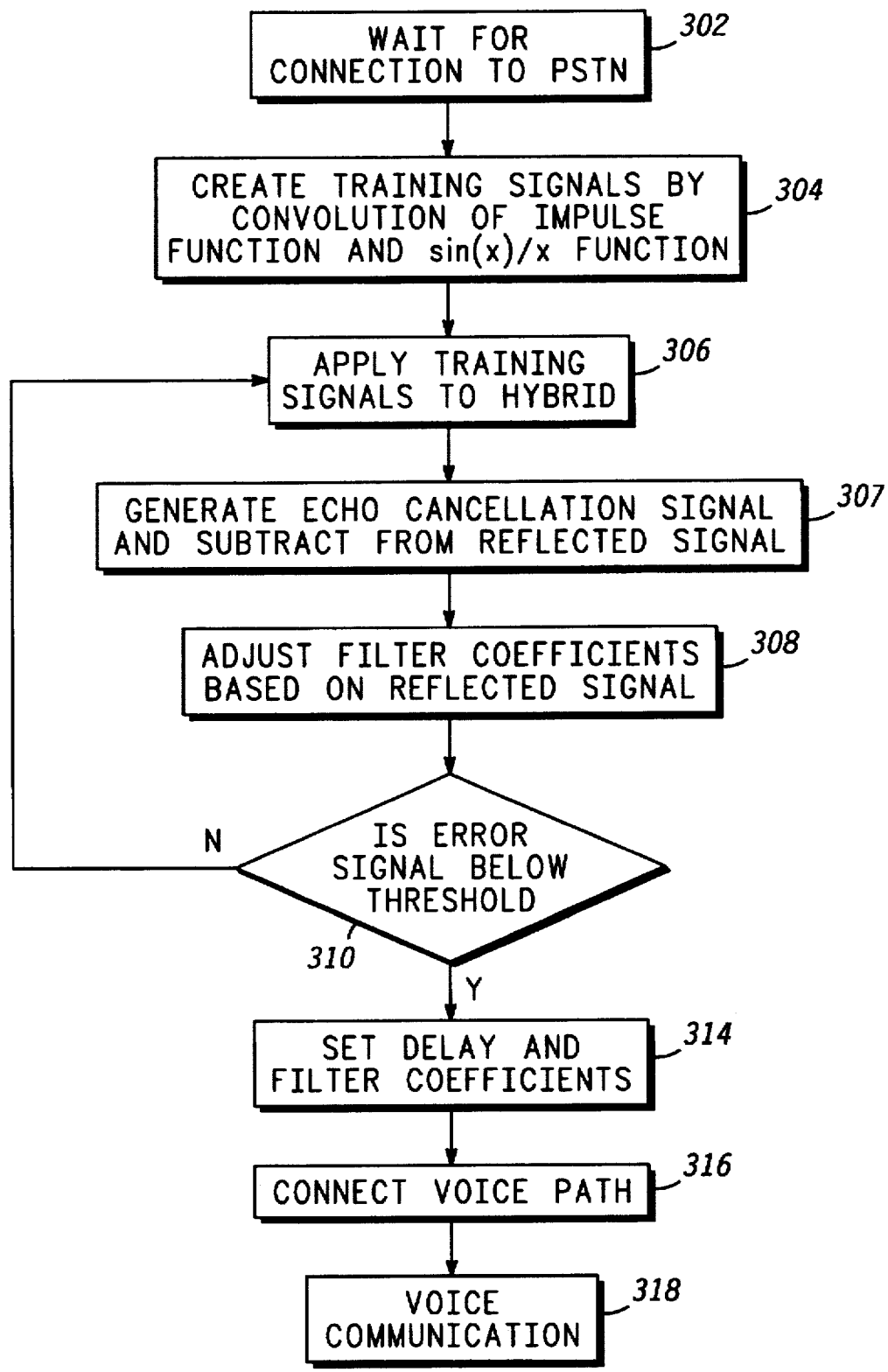
FIG. 3 is a flow chart illustrating an echo cancellation procedure in accordance with a preferred embodiment of the present invention.

FIG. 3 is a flow chart illustrating an echo cancellation procedure in accordance with a preferred embodiment of the present invention. The tasks of procedure 300 are preferably performed by portions of echo canceler 10 (FIG. 1) including various processors therein (not shown). Echo cancellation procedure 300 is preferably performed as part of tasks 122–124 of the flow chart of FIG. 2. Task 302 waits for the connection between the hybrid and a two-wire line system once a call is established. The call may have been originated on the four-wire line side of the two wire-line side. Once the connection is made, tasks 304–318 are performed.

In the preferred embodiment, tasks 304–314 are performed by controller 22. Task 304 creates training signals preferably comprised of an impulse function convolved with a $\sin(x)/x$ function. Other signal conditioning functions are also suitable for the training signals, for example, a chirp function is one alternative signal conditioning function. Task 306 transmits or applies the training sequences to the hybrid, and signals are reflected back down the receive path due to any impedance mismatch. Task 307 generates the echo cancellation signal and subtracts it from the reflected signals in the receive path. Task 308 adjusts the filter coefficients for the adaptive filter until the error signal $e(n)$ is below a threshold. Accordingly, when the error signal $e(n)$ is minimized, the reflected training signals are effectively suppressed or canceled. When task 310 determines that the error signal is below the threshold, task 314 sets the filter coefficients and task 316 switches in the transmit path. At this point, the controller no longer generates training signals and adjusts the filter coefficients.

Preferably during the performance of tasks 304–316, the training signals are muted to the voice paths to prevent annoying users. Once the transmit path is switched in, the communication mode begins and voice communication may commence in task 318.

Figure 4:
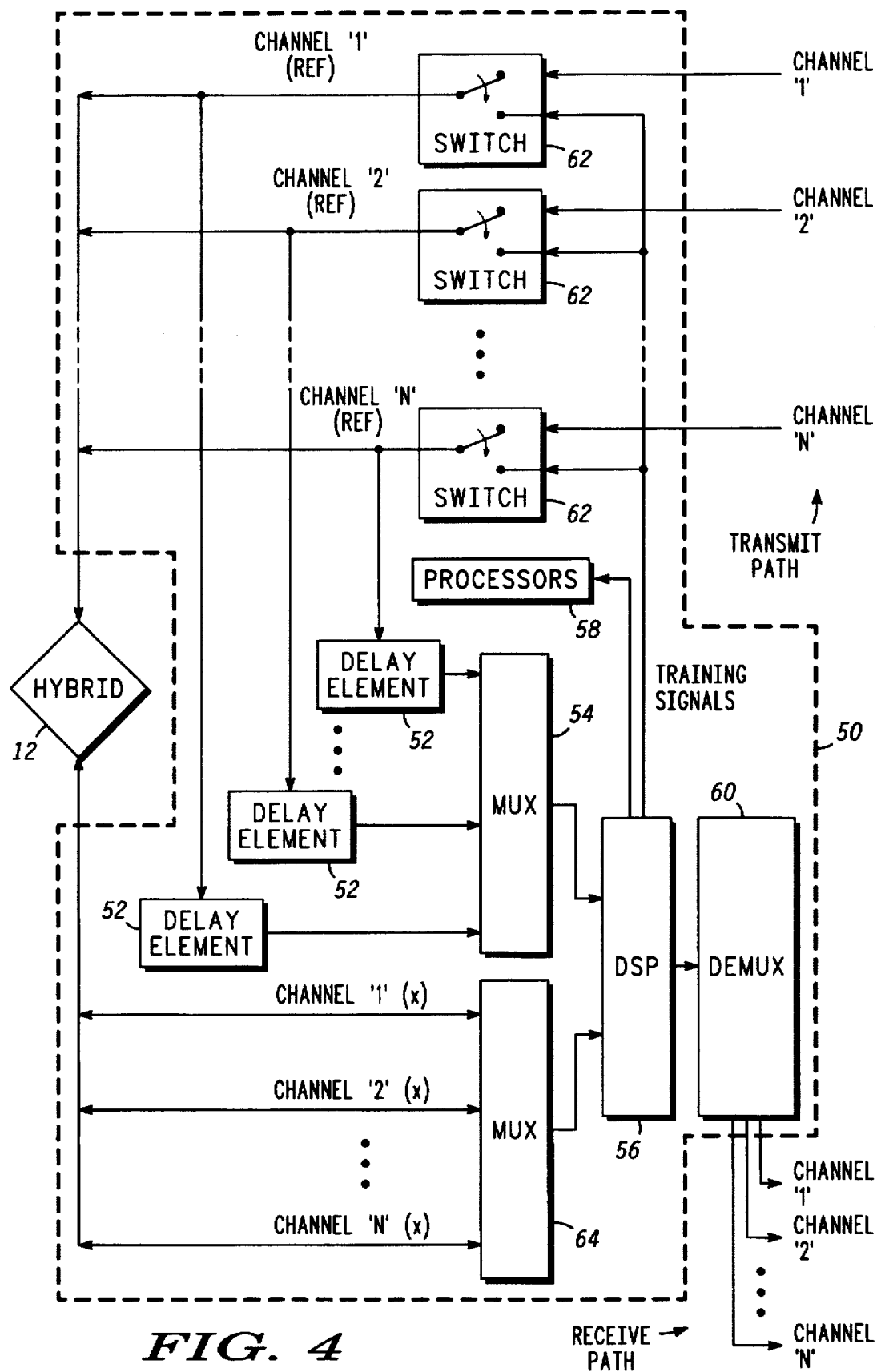
FIG. 4 is a simplified block diagram illustrating a multi-channel echo canceler in accordance with another preferred embodiment of the present invention.

FIG. 4 is a simplified block diagram illustrating a multichannel echo canceler in accordance with another preferred embodiment of the present invention. In this embodiment, herein referred to as the multichannel embodiment, multichannel echo canceler 50 functionally includes a plurality of echo cancelers 10 (FIG. 1). Accordingly, multichannel echo canceler 50 is suitable for use with a plurality of communication channels that interface between two-wire line systems and four-wire line systems. In the preferred embodiments, multichannel echo canceler 50 is used in gateways or mobile switching centers that provide an the interface between the PSTN and mobile or cellular telephone networks.

Multichannel echo canceler 50 includes a plurality of delay elements 52 and a plurality of switching elements 62. Functionally, there is one switching element and one delay element for each channel. Multichannel echo canceler 50 also includes a multiplexer 54 for multiplexing the delayed signals provided by delay elements 52. A second multiplexer 64 multiplexes signals received from hybrid 12, referred to in FIG. 1 as $x(n)$. Multichannel echo canceler 50 also includes a signal processing element 56 for performing the filtering functions of adaptive filter 16 (FIG. 1) and the combining functions of summer 18 (FIG. 1) for each channel. In combination with processors 58, signal processing element 56 also performs the functions of controller 22 (FIG. 1). Signal processing element 56 is preferably a digital signal processor (DSP). In the training mode, processing element 56 provides error signals $e(n)$ to demultiplexer 60, which provides the output signals for the receive paths of each channel.

Figure 5:
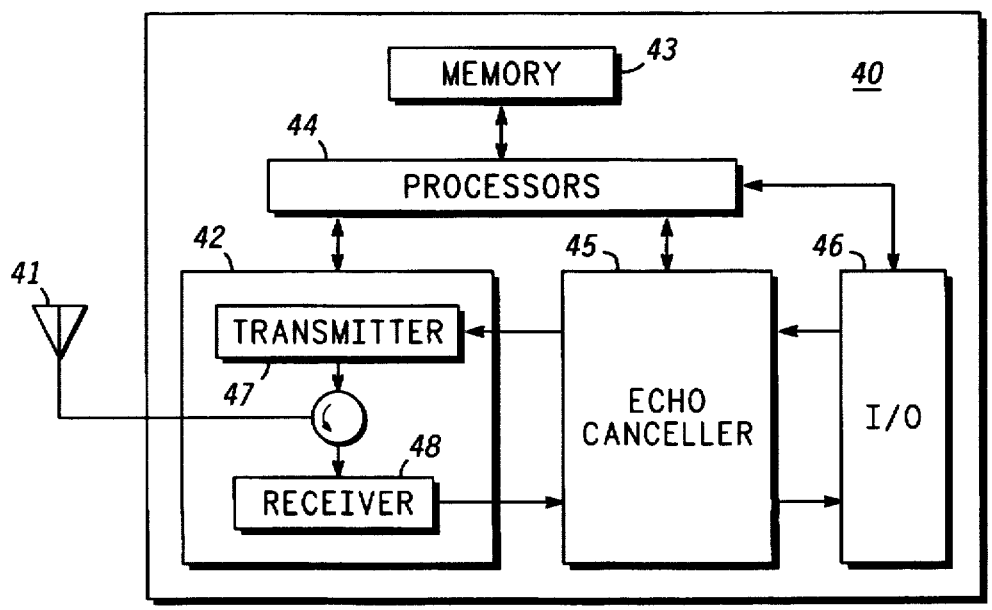
FIG. 5 illustrates a simplified block diagram of a subscriber unit suitable for use with a preferred embodiment of the present invention.

FIG. 5 illustrates a simplified block diagram of a subscriber unit suitable for use with a preferred embodiment of the present invention. Subscriber unit 40 preferably includes all the features of a mobile or cellular telephone. For clarity, only elements relevant to this embodiment of the present invention are shown. Subscriber unit 40 communicates with mobile and cellular type communication system, and may also communicate through such systems to other subscriber units or another telecommunication device. Subscriber unit 40 includes transceiver 42 which has a transmitter portion 47 for transmitting signals to the communication system and a receiver portion 48 for receives signals from the communication system using antenna 41. Transceiver 42 is desirably a multi-channel transceiver capable of transmitting and receiving on all frequency channels in specified time slots as required by communication system.

Transceiver 42 couples to processors 44, which, among other things, controls the frequency and timing parameters upon which transceiver 42 operates. In addition, processor 44 preferably controls the power level at which transceiver 42 transmits signals. Additionally, processor 44 desirably couples to input/output (I/O) section 46, a timer, and memory 43. Memory 43 includes semiconductor, magnetic, and other storage devices for storing data which serve as instructions to processor 44 and which, when executed by processor 44, cause subscriber unit 40 to carry out procedures for communication. In addition, memory 43 includes variables, tables, and databases that are manipulated during the operation of subscriber unit 40.

Subscriber unit 40 also includes an echo canceler portion 45, which is preferably similar to echo canceler 10 (FIG. 1) and/or performs procedures similar to procedure 300 (FIG.

3). Although echo canceler portion 45 is shown coupled between I/O section 46 and transceiver 42, this is not required. Echo canceler portion 45 may be embodied within transceiver 42 or may be provided inbetween antenna 41 and the transmitter and receiver portions.

In one embodiment of the present invention, the subscriber unit communicates with satellite communication stations in non-geostationary orbit that are in communication with a switching center. The switching center provides the interface between the two-wire line and four-wire line systems. In this embodiment, the transmit and receive paths include RF communication channels between the satellite communication station and the subscriber unit. The echo canceler includes a delay element for delaying the echo cancellation signals to compensate for a delays associated with the RF communication channels and delays between the satellite communication station and the interface.

Thus, an echo canceler and method have been described which overcomes specific problems and accomplishes certain advantages relative to prior art methods and mechanisms. The improvements over known technology are significant.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims. In particular, such modifications as alternative training sequences are within the scope of the claims.

What is claimed is:

1. A method for canceling signals reflected from an interface between a two-wire line system and a four-wire line system, the method comprising the steps of:

applying, for a period of time, training signals to said interface after a connection to said two-wire line system is completed, said training signals comprised of a convolution of an impulse function and a $\sin(x)/(x)$ function, said interface producing a reflected training signal;

generating an echo cancellation signal by filtering a sampled version of said training signals in an adaptive filter;

subtracting said echo cancellation signal from said reflected training signal to produce an error signal;

adjusting filter coefficients of said adaptive filter to minimize said error signal, said filter coefficients determining a transfer function of said adaptive filter; and using final of said filter coefficients to generate subsequent echo cancellation signals for voice communication between said two-wire line and four-wire line systems for which said connection was completed, said applying step not being performed during said voice communication.

2. A method as claim in claim 1 wherein said two-wire line system has one communication path for transmitting and receiving signals to said interface, and said four-wire line system has a transmit path for sending signals to said interface and a receive path for receiving communication signals from said interface, said interface comprising a hybrid, wherein said transmit path of said four-wire line system is isolated from said interface during the steps of applying, generating, subtracting and adjusting, and wherein the applying step is performed by a controller coupled to said interface, and wherein the method further comprises the steps of:

decoupling said controller from said interface after the performance of the steps of applying, generating, subtracting and adjusting; and coupling said interface with said transmit path of said four-wire line system to allow for voice communication between said two-wire line and four-wire line systems after the performance of the steps of applying, generating, subtracting and adjusting.

3. A method as claimed in claim 2 further comprising, after the coupling step, the steps of:

said adaptive filter filtering samples of voice data transmitted from said four-wire line system to generate said subsequent echo cancellation signals; and combining said subsequent echo cancellation signals with a receive path signal from said interface to suppress reflections of said voice data transmitted from said four-wire line system caused by said interface.

4. A method as claimed in claim 3 wherein the generating step further comprises the steps of:

sampling said training signals to produce said sampled version of said training singals; and filtering the sampled training signals with said adaptive filter to produce said echo cancellation signal.

5. A method as claimed in claim 4 wherein the generating step further comprises the steps of:

delaying said sampled version of said training signals by an amount based on a delay between said interface and said four-wire line system; and adjusting said amount of delay to compensate for delay between said interface and said four-wire line system.

6. A method as claimed in claim 5 wherein the generating step generates, using said adaptive filter, an inverse of said reflected training signal.

7. A method as claimed in claim 5 wherein the generating step generates said echo cancellation signal by performing least-means-square(LMS) calculations on said error signal.

8. An echo canceler for canceling signals reflected from an interface between a two-wire line system and a four-wire line system, wherein said two-wire line system has a single communication path for transmitting and receiving signals to said interface, and said four-wire line system has a transmit path for sending signals to said interface and a receive path for receiving communication signals from said interface, said interface comprising a hybrid, the echo canceler comprising:

a controller for providing filter coefficients and training signals, said training signals comprised of a convolution of an impulse function and a $\sin(x)/(x)$ function;

a switching element for coupling and decoupling said transmit path with said interface, and for coupling said controller with said interface when said controller is providing said training signals, said switching element providing said training signals for a period of time during said decoupling;

an adaptive filter for filtering sampled versions of said training signals and providing echo cancellation signals using said filter coefficients; and a summer for subtracting said echo cancellation signals from said receive path of said four-wire line system.

wherein final of said filter coefficients are used to generate subsequent echo cancellation signals for voice communication between said two-wire line and four-wire line systems after said switching element decouples said controller from said transmit path, said switching element decoupling from said controller after said period of time.

9. An echo canceler as claimed in claim 8 further comprising a delay element for delaying sampled versions of said training signals by an amount based on a delay between said interface and said four-wire line system, and wherein said controller adjusts said amount of delay to compensate for delay between said interface and said four-wire line system.

10. An echo canceler as claimed in claim 9 wherein said controller generates, using said adaptive filter, an inverse of reflected training signals.

11. An echo canceler as claimed in claim 10 wherein said summer subtracting said echo cancellation signals from said reflected training signals to generate an error signal and wherein said controller generates said echo cancellation signals by performing least-means-square calculations on said error signal.

12. A switching center that provides an interface between a two-wire line system and a four-wire line system, wherein said two-wire line system has a single communication path for transmitting and receiving signals to said interface, and said four-wire line system has a transmit path for sending signals to said interface and a receive path for receiving communication signals from said interface, the switching center comprising:

a hybrid coupled to said two-wire line system; and an echo canceler coupled between said hybrid and said four-wire line system, said echo canceler comprising:

a controller for providing filter coefficients and training signals, said training signals comprised of a convolution of an impulse function and a sin(x)/(x) function;

a switching element for coupling and decoupling said transmit path with said interface, and for coupling said controller with said interface when said controller is providing said training signals, said switching element providing said training signals for a period of time during said decoupling;

an adaptive filter for filtering sampled versions of said training signals and providing echo cancellation signals using said filter coefficients; and a summer for subtracting said echo cancellation signals from said receive path of said four-wire line system, wherein final of said filter coefficients are used to generate subsequent echo cancellation signals for voice communication between said two-wire line and four-wire line systems after said switching element decouples said controller from said transmit path, said switching element decoupling from said controller after said period of time.

13. A switching center as claimed in claim 12 wherein said echo canceler further comprises a delay element for delaying sampled versions of said training signals by an amount based on a delay between said interface and said four-wire line system, and wherein said controller adjusts said amount of delay to compensate for delay between said interface and said four-wire line system.

14. A switching center as claimed in claim 13 wherein said controller generates, using said adaptive filter, an inverse of reflected training signals.

15. A switching center as claimed in claim 14 wherein said summer subtracting said echo cancellation signals from said reflected training signals to generate an error signal and wherein said controller generates said echo cancellation signals by performing least-means-square calculations on said error signal.

* * * * *